Sept. 18, 1951 A. H. STADE 2,568,261
STABILIZER FOR HOUSE TRAILERS
Filed Dec. 6, 1949 3 Sheets-Sheet 1

Albert H. Stade
INVENTOR.

Sept. 18, 1951 A. H. STADE 2,568,261
STABILIZER FOR HOUSE TRAILERS
Filed Dec. 6, 1949 3 Sheets-Sheet 2

Albert H. Stade
INVENTOR.

BY *Clarence A. O'Brien*
*and Harvey B. Jackson*
Attorneys

Sept. 18, 1951 A. H. STADE 2,568,261
STABILIZER FOR HOUSE TRAILERS
Filed Dec. 6, 1949 3 Sheets-Sheet 3

Albert H. Stade
INVENTOR.

BY Clarence A. O'Brien
and Harvey B. Jackson
Attorneys

Patented Sept. 18, 1951

2,568,261

UNITED STATES PATENT OFFICE 2,568,261

STABILIZER FOR HOUSE TRAILERS

Albert H. Stade, Los Angeles, Calif.

Application December 6, 1949, Serial No. 131,261

9 Claims. (Cl. 280—33.4)

1

This invention relates to an equalizing or stabilizing device for securing a trailer to a tractor vehicle.

An object of this invention is to provide means which will dampen and minimize all horizontal and vertical oscillating of the trailer relative to the tractor vehicle.

A further object of the invention is to provide means for securing a trailer to a tractor vehicle to impart easy riding qualities to the trailer vehicle while maintaining an entirely safe and secure connection between the tractor vehicle and the trailer.

Another object of the invention is to provide ready and easy means to couple and uncouple a trailer to a tractor vehicle.

A further object of the invention is to provide a draft tongue for a trailer vehicle having means thereon for supporting the trailer and for providing a bumper when the trailer is unhitched from the tractor vehicle.

Still further objects of the invention reside in the provisions of a stabiliber for a trailer that is strong, durable, highly efficient in operation, relatively simple in construction, and manufacture, comparatively inexpensive, and quite easy to operate.

These, together with the various ancillary objects of the invention which will become apparent as the following description proceeds, are attained by this stabilizer for house trailers, a preferred embodiment of which has been illustrated in the accompanying drawings, by way of example only, wherein.

With continuing reference to the accompany-

Figure 1:
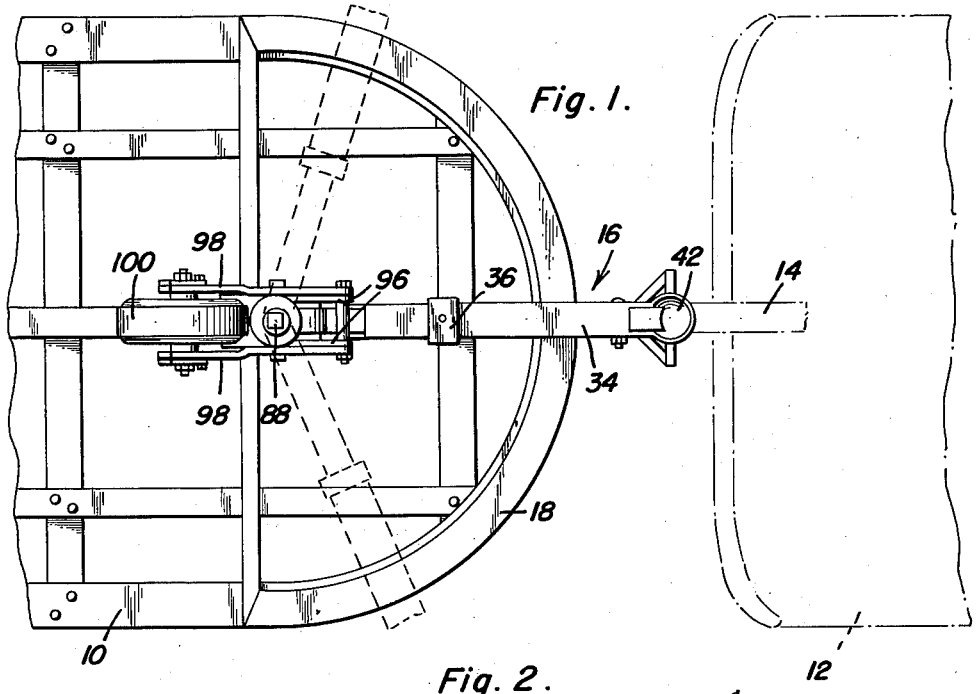
Figure 1 is a bottom plan view of the stabilizer comprising the present invention.
Figure 2:
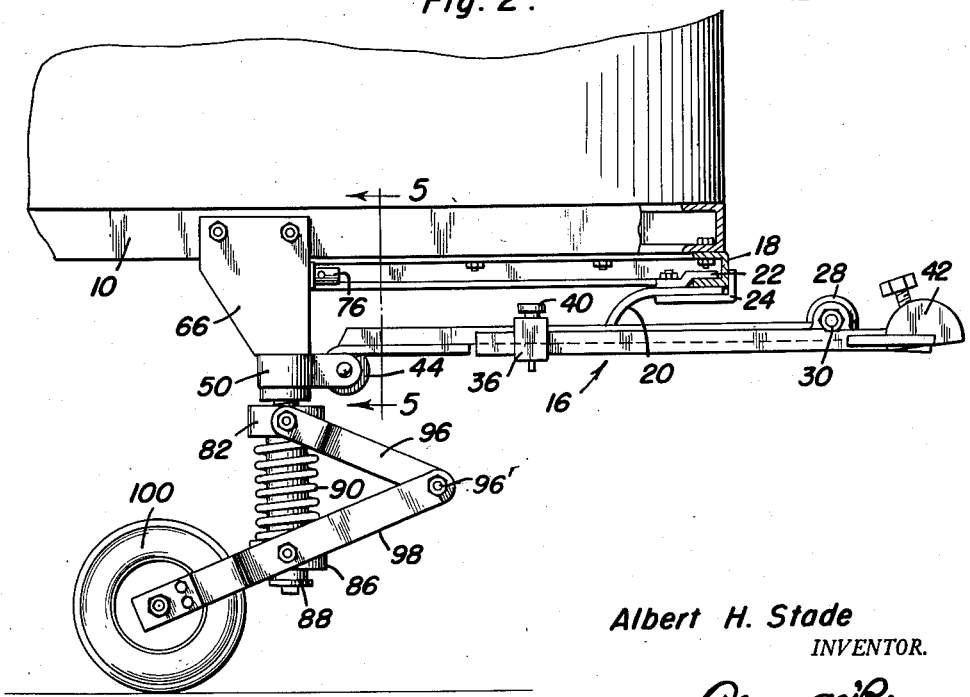
Figure 2 is a side elevational view of the invention.

2 ing drawings wherein like reference numerals designate similar parts throughout the various views, reference numeral 10 is used to generally designate a house trailer or like vehicle which is adapted to be towed behind a tractor vehicle 12 having a draw bar 14 to which the draft tongue generally designated by reference numeral 16 is adapted to be secured.

Figure 6:
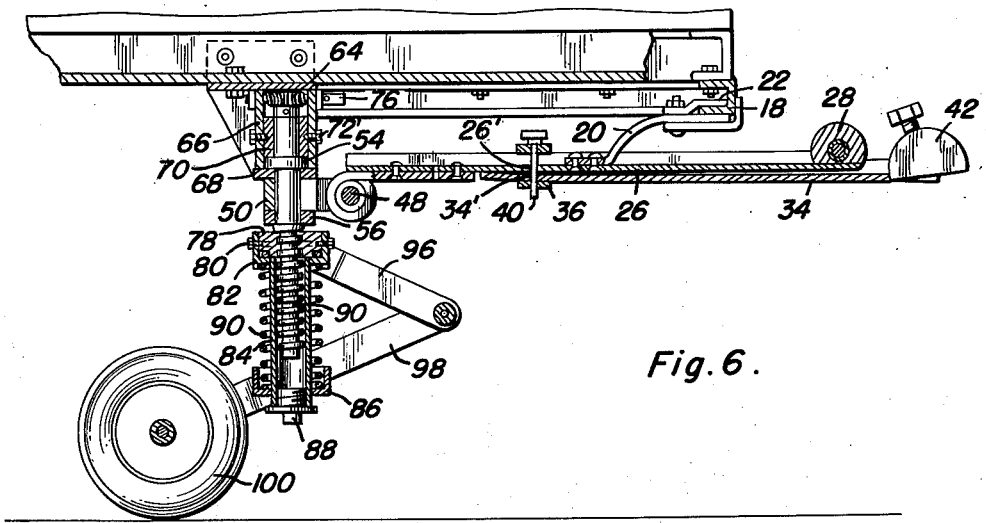
Figure 6 is a vertical sectional view of the invention showing the parts thereof in detail.

A semi-circular channel-shaped member 18 is secured to the trailer 10 and is engaged by a leaf spring member 20 having a retainer lug 22 bolted thereto to embrace the outermost leg of the channel member 18. Guide member 24 is also provided for sliding engagement with the channel member 18. As seen best in Figure 6 the other end of the leaf spring 20 is bolted or otherwise secured within an upper channel member 26 forming one part of the draft tongue 16. The upper channel member 26 is provided with a front end eye 28 through which a headed bolt 30 extends in engagement with lugs 32 having apertures therethrough. The lugs 32 are formed integral with a lower channel member 34 forming the other part of the draft tongue. The channel members 26 and 34 are each provided with aligned apertures 26', 34' and a slide 36 having an aperture 38 therethrough is adapted to be positioned in alignment with the apertures 26', 34' in said channel members so that pin 40 may be secured through all the aligned apertures to hold said channel members 26, 34 in a rigid manner. At the front end of the channel element 34 is pivotally secured a conventional coupling element 42. Secured to the bottom portion of the rear end of the channel member 26 is another member 44 formed with an eye 45 containing a bearing 46. A pin 48 pivotally secures the eye 45 between flanges 52 of a bearing element 50 so that the draft tongue 16 is vertically swingable on the bearing element 50.

Figure 7:
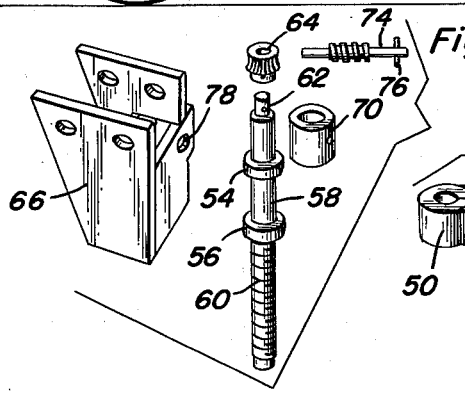
Figure 7 is an exploded view of the housing and shaft comprising several elements of the present invention; and, Figures 8 through 10 inclusive are perspective exploded views of several elements which are adapted to be secured together to form the stabilizer.
Figure 9:
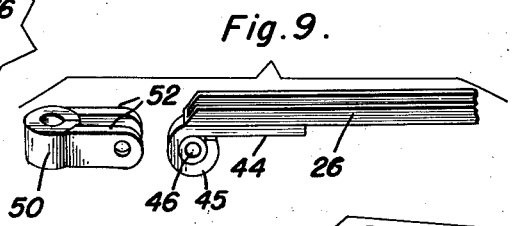
Figure 8:
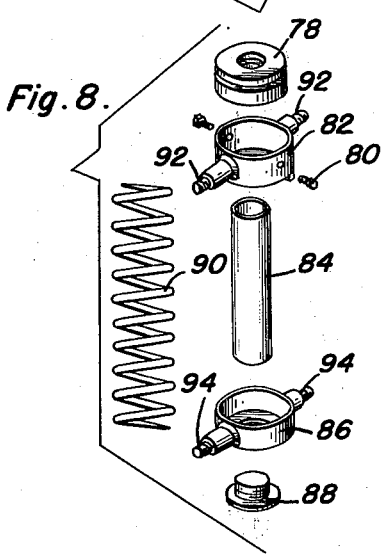
Figure 10:
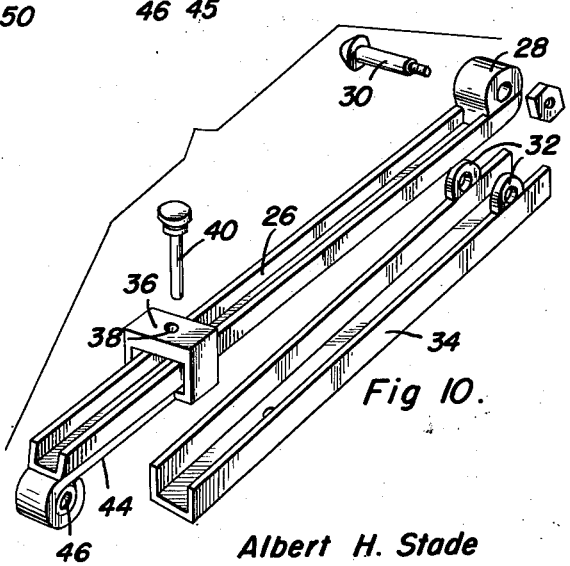

The bearing element 50 is rotatably secured between collars 54 and 56 which are rigidly secured to a vertical shaft 58 which is threaded at its bottom portion 60, and is provided at its upper portion with a reduced neck 62 on which a worm gear 64 is adapted to be pinned or elsewhere secured. The shaft 58 is rotatable in a casing 66 which is bolted or otherwise secured to the trailer 10 and is provided with a bottom portion 68 against which the collar 54 fits. A journal bearing element 70 is positioned about the shaft 58 within the casing 66 and pins 72 are used to rigidly secure the bearing 70 in the casing so as to rotatably confine the collar 54 between said bottom portion 68 and said element 70. A worm 74 having a handle 76 thereon is journalled in the housing through aligned apertures 78, one of which is shown in Figure 7, said worm meshing with the worm gear 64. Upon rotation of the worm 74 the worm gear 64 will cause the threaded portion 60 to rotate to thus raise or lower a threaded collar 78 on said portion 60 and which is secured by set screws 80 in a collar 82 to which is welded or otherwise secured the upper end of a vertical tubular shaft 84 coaxial with the shaft and slidable on said portion 60. The collar 82 actually provides a clamping means for securing the tubular shaft 84 to the threaded collar 78. A retainer collar 86 is vertically slidable on the lower end of the tubular shaft 84 and a plug member 88 is provided at the lower end of the tubular shaft 84 to limit the downward displacement of the retainer collar 86. The plug 88 is threaded or otherwise secured to the shaft 84. Coil spring 90 is provided on the tubular shaft 84 between the collars 82 and 86 to cushion upward sliding of the retainer collar 86. A pair of vertically swingable links 96 incline downwardly and forwardly from opposite sides of the collar 82 with rear ends pivoted on a pair of diametrically opposite nut-equipped shafts 92 on said collar 82. A pair of vertically swingable links 98 on opposite sides of the collar 86 incline downwardly and rearwardly from the pair of links 96 with front ends pivoted, as at 96', between the front ends of the links 96. The links 98 are pivoted intermediate their ends on a pair of diametrically opposite nut-equipped shafts 94 on said collar 86 and carry between their rear ends in the rear of the hollow shaft 84 a trailer supporting front ground wheel 100. As will be clear, the collars 78, 82, 86 and tubular shaft 84, together with the links 96, 98 form a caster wheel mounting rotatable about the axis of the shaft 58 and arranged for vertical screw feed adjustment by rotation of the shaft 58 to adjust the front end of the trailer 10 vertically The links 96, 98 and collar 86 form a wheel yoke cushioned by the spring 60 for yielding vertical play and spring suspension of the trailer 10 by spring suspension of the links 98.

Figure 3:
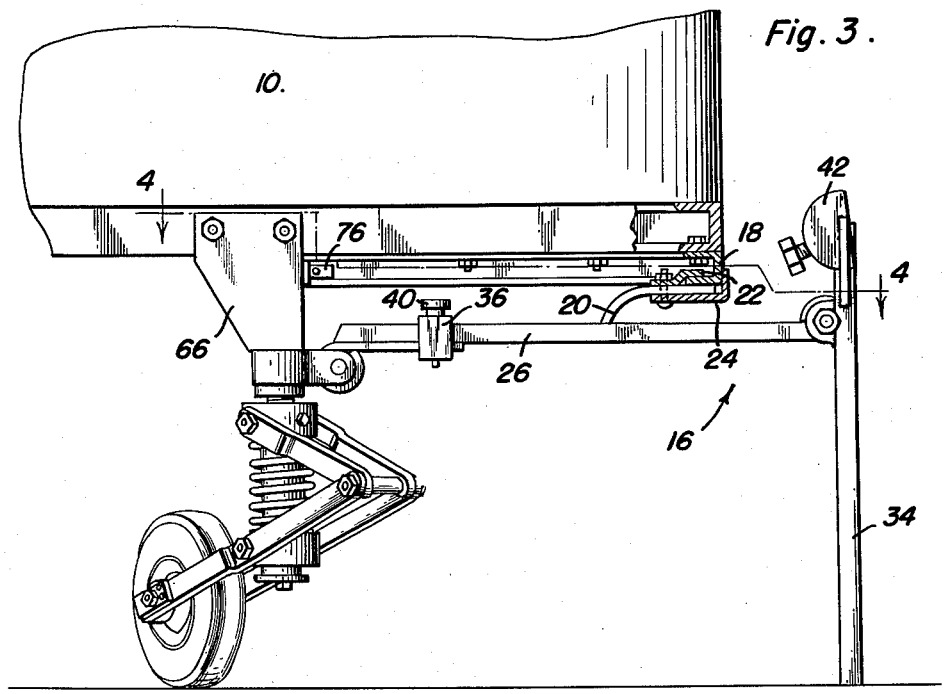
Figure 3 is a perspective view of the stabilizer for house trailers showing it in a different position from that shown in Figures 1 and 2.
Figure 4:
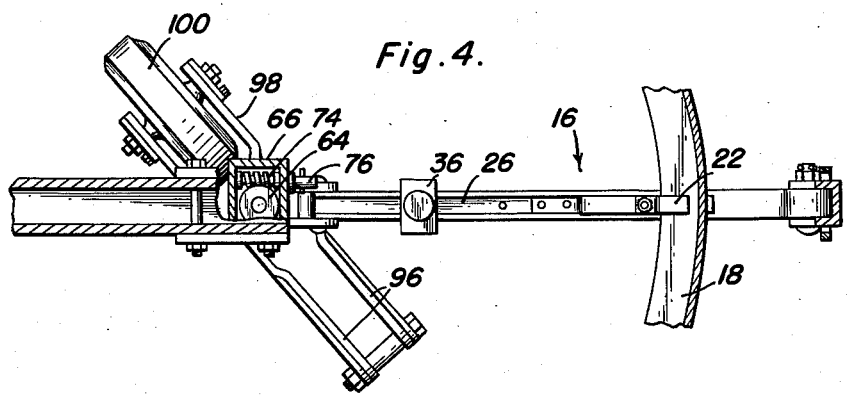
Figure 4 is a horizontal sectional view as taken along line 4—4 in Figure 3.
Figure 5:
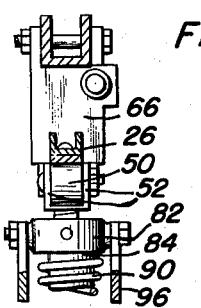
Figure 5 is a vertical sectional view as taken along line 5—5 in Figure 2.

As can be seen best in Figure 3 when it is desired to disengage the trailer from the tractor, the draw bar 14 may be uncoupled from the draft tongue 16 by releasing of the coupling element 42 in the conventional manner. Then the member 34 may be rotated to a position so as to provide a combined ground engaging support and bumper for the house trailer.

Since the distance below the house trailer at which the wheel 100 is attached can be easily regulated by the vertical position of the threaded portion 60 of the shaft in the threaded collar 78, the rotation of the worm gear 64 provides easy means for raising and lowering the trailer so as to provide for coupling and uncoupling the draft tongue 16 and maintaining said draft tongue 16 level.

As will be seen the draft tongue 16 can swing vertically on the pin 48 to compensate for relative vertical play of the trailer 10 and draft tongue 16 and the leaf spring 20 cushions such play between said trailer and tongue.

Since from the foregoing, the construction and advantages of this stabilizer for a house trailer are readily apparent, further description is believed to be unnecessary.

However, since numerous modifications will readily occur to those skilled in the art and after a consideration of the foregoing specification and accompanying drawings, it is not desired to limit the invention to the precise embodiment of the trailer hitch shown and described, but all suitable modifications and equivalents may be resorted to which fall within the scope of the appended claims.

Having described the invention, what is claimed as new is:

1. In a stabilizer for a trailer having a depending shaft and a draft tongue adapted to be coupled to a tractor, means pivotally connecting said tongue to said shaft for swinging laterally and vertically relative thereto, a semi-circular member fixed to said trailer horizontally above said tongue concentric to said shaft, and a leaf spring slidably connected at one end to said member and fixed at its other end to said tongue for swinging along said member by lateral swinging of said tongue and flexing by relative vertical movement of said trailer and tongue.

2. In a stabilizer for a trailer having a depending shaft and a draft tongue for coupling to and uncoupling from a tractor, means pivotally connecting said tongue to said shaft for lateral and vertical swinging relative thereto, a semi-circular member fixed to said trailer horizontally above said tongue and concentric to said shaft, and a leaf spring slidably connected at one end to said member and fixed at its other end to said tongue for swinging along said tongue by lateral swinging of said tongue and flexing by vertical swinging of said tongue, said tongue comprising hingedly connected sections one swingable independently downwardly on the other into ground engaging trailer supporting position and being swingable upwardly into draft position, and a coupling on said independently swingable section for attachment to the trailer disposed forwardly of said hinged connection when said independently swingable section is swung upwardly into draft position.

3. A stabilizer according to claim 2, wherein said sections comprise channel bars, one fitting in the other when said independently swingable section is swung upwardly.

4. A stabilizer according to claim 1, wherein said shaft is rotatably mounted to the trailer, a ground wheel, and screw feed spring suspension means for mounting said wheel on said shaft for vertical adjustment of the trailer relative to said tongue to maintain said tongue horizontal when coupled and providing for vertical play of said trailer relative to said wheel.

5. In a stabilizer for a trailer having a depending shaft and a draft tongue having a pivoted connection to said shaft whereby said tongue and trailer are vertically swingable relatively, means for raising and lowering said trailer to maintain said tongue level comprising a journal bearing rotatably connecting said shaft to said trailer, a ground wheel, a screw portion on said shaft, a collar threaded onto said portion for vertical screw feed thereon and rotation independently thereof, a pair of opposite links inclining downwardly from opposite sides of said collar at one side of said shaft and pivoted at corresponding ends thereof to said collar for vertical swinging movement, a second pair of opposite links pivoted at corresponding ends thereof to the other ends of the first-named links and inclining downwardly therefrom across said shaft, a ground wheel mounted between the other ends of the second links, a spring suspension for said second links connecting the same to said collar, and means to rotate said shaft.

6. A stabilizer for a trailer according to claim 5, wherein said spring suspension comprises a second collar intermediate the second pair of links pivoted thereto and vertically movable and rotatable about said shaft, and a coil spring surrounding said shaft between said collars.

7. In a trailer, a shaft depending from one end thereof and having a screw portion thereon, a journal bearing rotatably connecting said shaft at its upper end to said trailer, a collar threaded onto said portion for screw feed thereby and rotation independently thereof, a pair of opposite links inclining downwardly from opposite sides of the collar at one side of said shaft and pivoted at corresponding ends thereof to said collar for vertical swinging movement, a second pair of opposite links pivoted at corresponding ends thereof to the other ends of the first-named links and inclining downwardly therefrom across said shaft, a ground wheel mounted between the other ends of the second links, a spring suspension for said second links connecting the same to said collar, and means to rotate said shaft.

8. The combination according to claim 7, wherein said spring suspension comprises a second collar pivoted intermediate the second pair of links thereto, and a coil spring interposed between said collars.

9. The combination according to claim 7, wherein said spring suspension comprises a tubular shaft depending from said collar and endwise slidable and rotatable on said screw portion, a second collar vertically slidable and rotatable on said tubular shaft and pivoted to the second-named links between the same, and a coil spring surrounding the tubular shaft between said collars.

ALBERT H. STADE.

REFERENCES CITED

The following references are of record in the file of this patent:

UNITED STATES PATENTS

| Number | Name | Date |
|---|---|---|
| 324,827 | Fuller | Aug. 25, 1885 |
| 745,803 | Edeline | Dec. 1, 1903 |
| 2,134,351 | Arehart | Oct. 25, 1938 |

FOREIGN PATENTS

| Number | Country | Date |
|---|---|---|
| 351,683 | France | May 11, 1905 |
| 411,787 | France | June 25, 1910 |